US011175647B2

(12) United States Patent
Tanaka et al.

(10) Patent No.: US 11,175,647 B2
(45) Date of Patent: Nov. 16, 2021

(54) MOTOR CONTROLLER

(71) Applicant: FANUC CORPORATION, Yamanashi (JP)

(72) Inventors: Shunpei Tanaka, Yamanashi (JP); Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 279 days.

(21) Appl. No.: 16/004,639

(22) Filed: Jun. 11, 2018

(65) Prior Publication Data

US 2018/0364682 A1 Dec. 20, 2018

(30) Foreign Application Priority Data

Jun. 14, 2017 (JP) .............................. JP2017-116583

(51) Int. Cl.
*G05B 19/416* (2006.01)
(52) U.S. Cl.
CPC .. *G05B 19/416* (2013.01); *G05B 2219/37388* (2013.01); *G05B 2219/43006* (2013.01)
(58) Field of Classification Search
CPC .................................................. G05B 19/416
See application file for complete search history.

(56) References Cited

U.S. PATENT DOCUMENTS

2003/0205984 A1* 11/2003 Yoshida ............... G05B 19/404
318/801
2007/0132421 A1* 6/2007 Iwashita .............. G05B 19/404
318/650
2010/0148714 A1* 6/2010 Okita .................. G05B 19/404
318/561

(Continued)

FOREIGN PATENT DOCUMENTS

| CN | 1983095   | 6/2007  |
|----|-----------|---------|
| CN | 101753094 | 6/2010  |
| JP | 10-285969 | 10/1998 |

(Continued)

OTHER PUBLICATIONS

Office Action dated May 30, 2019 in Chinese Patent Application No. 201810570479.0.

*Primary Examiner* — Lisa E Peters
(74) *Attorney, Agent, or Firm* — Wenderoth, Lind & Ponack, L.L.P.

(57) ABSTRACT

A controller of a motor that drives a driven body includes: an inertia estimating unit that estimates inertia on the basis of feedback information (torque and current) of the motor; a computing unit that computes an acceleration or deceleration time constant of the motor from the estimation inertia estimated by the inertia estimating unit; a storage unit that stores an inertia difference which is a difference between the estimation inertia and at least one known actual inertia and a time constant difference which is a difference between an actual acceleration or deceleration time constant corresponding to the actual inertia and an acceleration or deceleration time constant calculated on the basis of the estimation inertia; and a correction unit that corrects the acceleration or deceleration time constant calculated by the computing unit using the inertia difference and the time constant difference stored in the storage unit.

3 Claims, 4 Drawing Sheets

(56) References Cited

U.S. PATENT DOCUMENTS

2018/0107173 A1* 4/2018 Tian .................... G05B 13/024

FOREIGN PATENT DOCUMENTS

| | | |
|---|---|---|
| JP | 2001-352773 | 12/2001 |
| JP | 2005-6418 | 1/2005 |
| JP | 2007-141189 | 6/2007 |
| JP | 2007-164362 | 6/2007 |
| JP | 2010-148178 | 7/2010 |
| JP | 2011-134169 | 7/2011 |
| WO | 2015/087455 | 6/2015 |
| WO | 2016/056143 | 4/2016 |

* cited by examiner

MOTOR CONTROLLER

This application is based on and claims the benefit of priority from Japanese Patent Application No. 2017-116583, filed on 14 Jun. 2017, the content of which is incorporated herein by reference.

BACKGROUND OF THE INVENTION

Field of the Invention

The present invention relates to a controller of a motor that drives a driven body.

Related Art

Conventionally, Patent Documents 1 to 4 disclose techniques related to a controller for controlling a motor to operate a driven body.

Patent Document 1 discloses a technique of gradually changing parameters until a difference between a command and a feedback is smaller than an allowable value when an optimal value of a servo parameter changes with aging. In Patent Document 1, a time constant is increased until a positional deviation falls within an allowable range by gradually decreasing an acceleration when a vibration is likely to occur in an actual response and when tracking ability of control is low.

Patent Document 2 discloses a method of detecting an acceleration using an acceleration detector and correcting a gain when the acceleration exceeds a certain threshold. In Patent Document 2, when it is determined whether an instantaneous value, a mean value, or a square mean value of an acceleration difference between a motor and a load structure is larger than a predetermined value, the acceleration difference is obtained using an angular detection value of the motor and an acceleration detection value of the load structure.

Patent Document 3 discloses a technique of storing a gain table and reading an optimal gain depending on machine rigidity in a device and a method for setting control parameters of a motor controller. Patent Document 3 relates to a technique of changing a gain value of a PI controller of a servo system and discloses a gain scheduling method of increasing the gain when the inertia of a load is large and decreasing the gain when the inertia of a load is small.

Patent Document 4 discloses a technique of computing the inertia from a torque constant of a motor and a representative current value and a representative acceleration value obtained from current values and acceleration values in a plurality of periods of a sinusoidal command, stored in a sampling data storing unit as a method for estimating the inertia.

Patent Document 1: Japanese Unexamined Patent Application, Publication No. 2011-134169
Patent Document 2: Japanese Unexamined Patent Application, Publication No. 2007-141189
Patent Document 3: Japanese Unexamined Patent Application, Publication No. 2005-006418
Patent Document 4: Japanese Unexamined Patent Application, Publication No. 2010-148178

SUMMARY OF THE INVENTION

However, an operation of a driven body (work) operated by a motor is determined by an acceleration or deceleration time constant adjusted on the basis of a maximum loading capacity of a machine tool. From the viewpoint of efficiency, it is preferable that an acceleration time is as short as possible within an allowable range of an output torque although the output torque is different depending on a load or the like of a machining target work or a mechanism of a machine tool for moving the work. On the other hand, when the motor is operated in an extremely short acceleration time (an acceleration or deceleration time constant), the position control of the motor may become unstable (a vibration may occur).

Although the conventional techniques disclose a method for adjusting an acceleration or deceleration, when an acceleration or deceleration time constant is set on the basis of inertia, it is difficult to eliminate the effect of friction occurring in a motor during machining, misalignment of the work, or the like, and a difference may occur between estimated inertia and actual inertia. The motor may operate at an excessively high acceleration depending on how an inertia estimation result shifts from the actual inertia. The conventional techniques have a room for improvement in that the acceleration is set to fall within an appropriate range when an error occurs in estimation of inertia.

An object of the present invention is to provide a motor controller capable of reliably preventing a driven body from moving at an excessively high acceleration by setting an acceleration or deceleration time constant set on the basis of inertia to fall within an appropriate range.

(1) A controller (for example, a controller 2 to be described later) of a motor (for example, a motor 10 to be described later) that drives a driven body (for example, a work W to be described later), the controller including: an inertia estimating unit (for example, an inertia estimating unit 22 to be described later) that estimates inertia on the basis of feedback information of the motor; a computing unit (for example, a computing unit 31 to be described later) that computes an acceleration or deceleration time constant of the motor from the estimation inertia estimated by the inertia estimating unit; a storage unit (for example, a storage unit 32 to be described later) that stores an inertia difference which is a difference between the estimation inertia and at least one known actual inertia and a time constant difference which is a difference between an actual acceleration or deceleration time constant corresponding to the actual inertia and an acceleration or deceleration time constant calculated on the basis of the estimation inertia; and a correction unit (for example, a correction unit 33 to be described later) that corrects the acceleration or deceleration time constant calculated by the computing unit using the inertia difference and the time constant difference stored in the storage unit.

(2) In the controller according to (1), the acceleration or deceleration time constant may be corrected using coefficients acquired by performing polynomial fitting with respect to a plurality of inertia differences and a plurality of time constant differences.

(3) In the controller according to (1) or (2), the correction unit may set a maximum value and a minimum value of the acceleration or deceleration time constant or both from the difference stored in the storage unit.

According to the motor controller according to the present invention, it is possible to reliably prevent a driven body from moving at an excessively high acceleration by setting an acceleration or deceleration time constant set on the basis of inertia to fall within an appropriate range.

DETAILED DESCRIPTION OF THE INVENTION

Hereinafter, a preferred embodiment of the present invention will be described with reference to the drawings.

Figure 1:
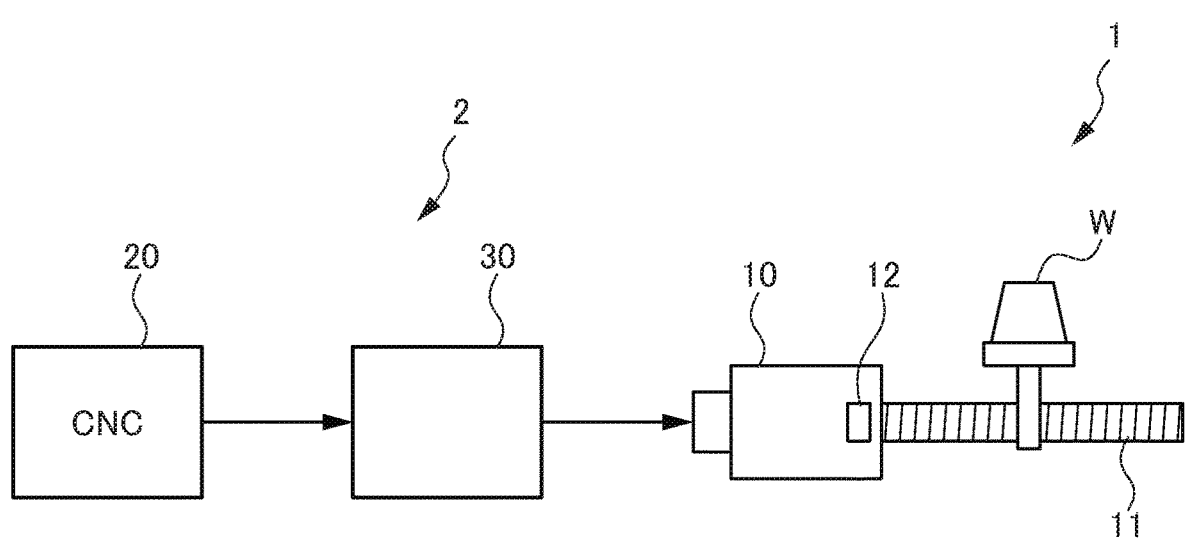
FIG. 1 is a diagram schematically illustrating a machine tool to which a controller according to an embodiment of the present invention is applied.

FIG. 1 is a diagram schematically illustrating a machine tool 1 to which a controller according to an embodiment of the present invention is applied. First, a configuration example of the machine tool 1 will be described. The machine tool 1 illustrated in FIG. 1 is a machining device that machines a work (a driven body) W into a desired shape.

The machine tool 1 of the present embodiment includes a controller 2 including a numerical controller 20 and a servo controller 30, a motor 10 controlled by the controller 2, and a feed axis (a transmission mechanism) 11 that moves the work W using the driving force of the motor 10.

The numerical controller 20 is a computerized numerical control (CNC) and performs various processes of controlling the machine tool 1. The servo controller 30 controls driving of the motor 10 on the basis of a command from the numerical controller 20.

The motor 10 is a servomotor that applies definition to the feed axis 11. When the feed axis 11 is driven, the work W which is a driven body moves to a predetermined position. A position detector 12 such as an encoder is attached to the motor 10, and a detection signal obtained by the position detector 12 is used for various processes such as feedback control.

Figure 2:
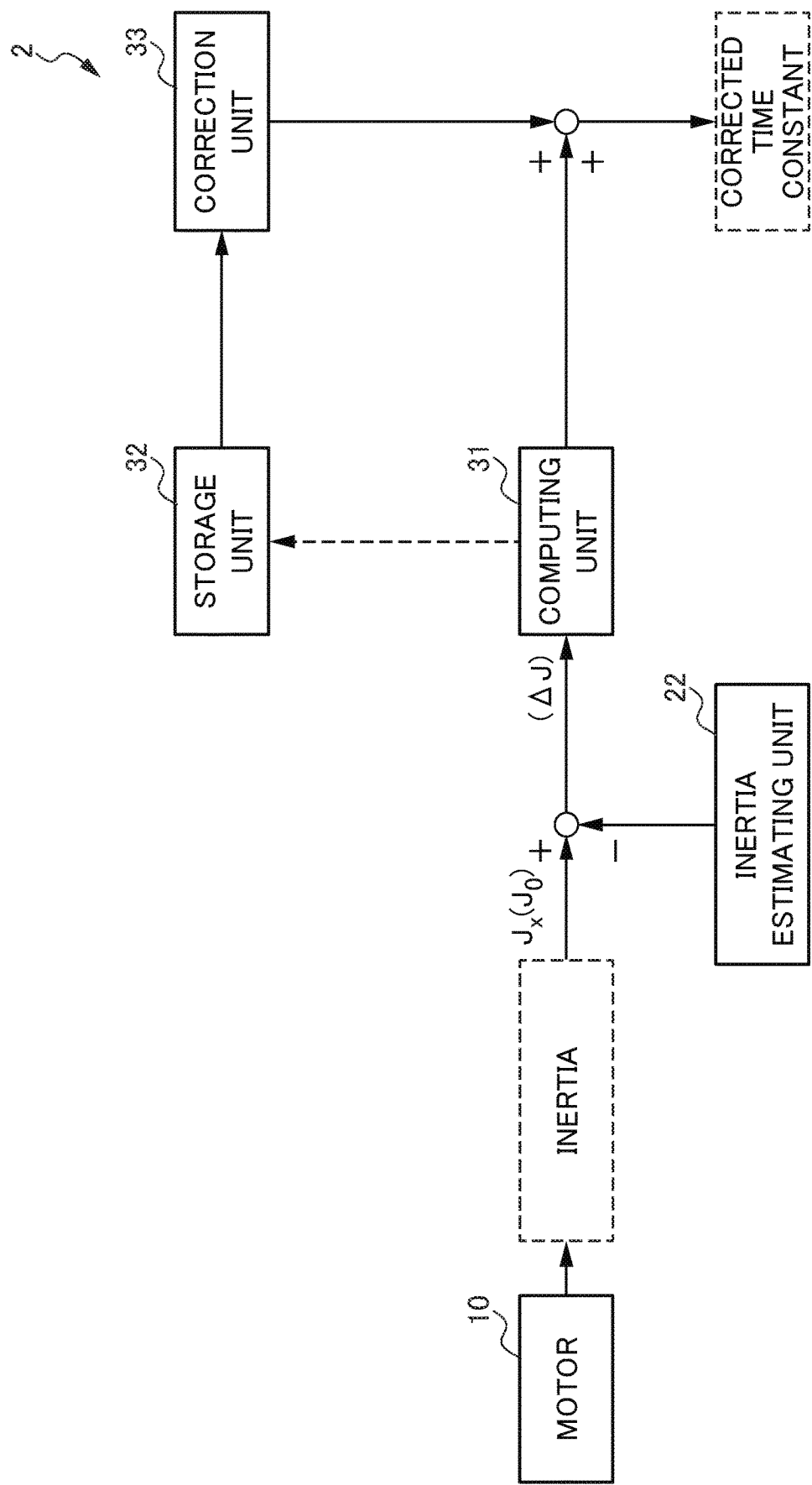
FIG. 2 is a block diagram illustrating a configuration related to servo control of the controller according to the present embodiment.

Next, a configuration of estimating inertia will be described. FIG. 2 is a block diagram illustrating a configuration related to servo control of the controller 2 according to the present embodiment. The respective units illustrated in FIG. 2 are realized by the numerical controller 20 or the servo controller 30, and an arrangement position thereof is not particularly limited. The functions may be realized by the numerical controller 20, the servo controller 30, or an external device other than the numerical controller 20 and the servo controller 30.

As illustrated in FIG. 2, the controller 2 includes an inertia estimating unit 22, a computing unit 31, a storage unit 32, and a correction unit 33.

The inertia estimating unit 22 estimates the inertia of the work W mounted in the machine tool 1 on the basis of a feedback signal (feedback information) of the motor 10 acquired during a predetermined operation. The feedback signal of the motor 10 relates to torque, current, speed, and the like. For example, the inertia is calculated on the basis of a speed feedback signal from the position detector 12 of the motor 10 and a current feedback signal from an amplifier (not illustrated) of the servo controller 30.

The inertia estimating unit 22 calculates the inertia on the basis of a predetermined estimation equation. Equation (1) below can be used as the inertia estimation equation, for example. The inertia estimating unit 22 acquires variables such as current I, an angular acceleration ω, and disturbance Tf as feedback signals to estimate inertia. The current feedback signal can be acquired as an effective current calculated using the phase information of the position detector 12. The angular acceleration ω can be obtained by differentiating an angular speed, for example. The inertia estimation method is not limited to this method but can be changed appropriately.

$$Jw=(kt \cdot I - Tf)/\omega \quad (1)$$

Jw: Inertia
kt: Torque constant
I: Current
Tf: Disturbance (Friction or the like)
ω: Angular acceleration A process of adjusting the time constant of acceleration or deceleration optimally on the basis of the estimated inertia (hereinafter, estimation inertia) is performed. Although the output torque to be generated by the motor 10 is different depending on the load of the machining target work W and a mechanism of the machine tool 1 for moving the work W, it is preferable that the acceleration time is as short as possible within an allowable range of the output torque. On the other hand, when the motor is operated in an extremely short acceleration time (an acceleration or deceleration time constant), the position control of the motor may become unstable (a vibration may occur). For example, when the acceleration or deceleration time constant is set to be shorter than an appropriate value in relation to the performance of the motor 10 and the inertia of the work W, it may not be possible to perform the commanded acceleration or deceleration due to restriction of the performance of the motor 10, the output torque may saturate in relation to a command torque, and it may not be possible to perform control properly. In contrast, when the acceleration or deceleration time constant is set to be longer than an appropriate value, acceleration or deceleration is performed slower than necessary which results in a decrease in productivity. Therefore, the acceleration or deceleration time constant is adjusted optimally on the basis of estimation inertia.

In the process of optimizing the acceleration or deceleration time constant, for example, an optimal time constant for inertia is obtained in advance theoretically or experimentally, and the optimal time constant is set on the basis of the estimated inertia. The optimal time constant may be selected from predetermined values and may be calculated sequentially, and an appropriate method may be employed.

The computing unit 31 calculates the acceleration or deceleration time constant on the basis of the estimation inertia estimated by the inertia estimating unit 22.

The storage unit 32 stores a correction amount for correcting the acceleration or deceleration time constant. The correction unit 33 corrects the acceleration or deceleration time constant on the basis of the correction amount stored in the storage unit 32 and calculates a corrected time constant (an acceleration or deceleration time constant).

Figure 3:
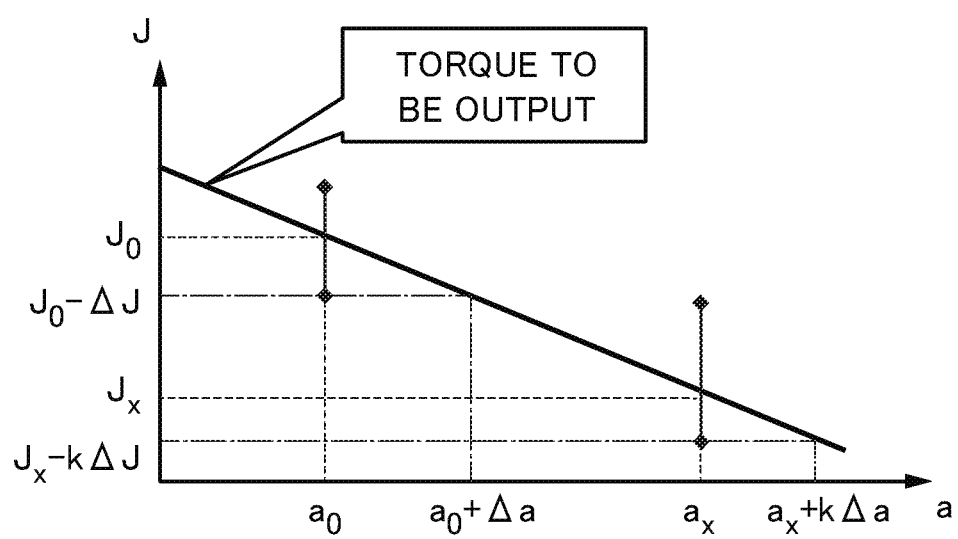
FIG. 3 is a graph illustrating a relationship between inertia and an acceleration or deceleration time constant.

A method of determining the correction amount will be described. FIG. 3 is a graph illustrating the relation between the inertia and the acceleration or deceleration time constant. In the graph of FIG. 3, the horizontal axis is an acceleration or deceleration time constant a and the vertical axis is an inertia J. The acceleration or deceleration time constant a corresponding to the inertia J is set on the basis of an output torque determined according to machining conditions and the performance or the motor 10, and the work W moves at an acceleration determined by the acceleration or deceleration time constant a.

When a shift occurs between an actual inertia (an actual value) and the estimation inertia (estimated value) estimated by the inertia estimating unit 22, a shift also occurs in the acceleration or deceleration time constant a set on the basis of the estimation inertia. When the actual acceleration or deceleration time constant corresponding to a known inertia $J_0$ is $a_0$, and an estimation inertia $J_0'$ has a deviation of $\Delta J$ like $J_0'=J_0\pm\Delta J$, the acceleration or deceleration time constant calculated from the estimation inertia $J_0'$ is $a_0'=a_0+\Delta a$. Therefore, the acceleration or deceleration time constant a also has a deviation of $\Delta a$, and the acceleration or deceleration time constant is excessively large in the case of FIG. 3.

Therefore, in the present embodiment, a process of acquiring a correction amount for correcting the estimation inertia on the basis of a relation between the known actual inertia $J_0$ and the estimation inertia $J_0'$ estimated by the inertia estimating unit 22 in advance and correcting the estimation inertia on the basis of the correction amount is performed.

Figure 4:
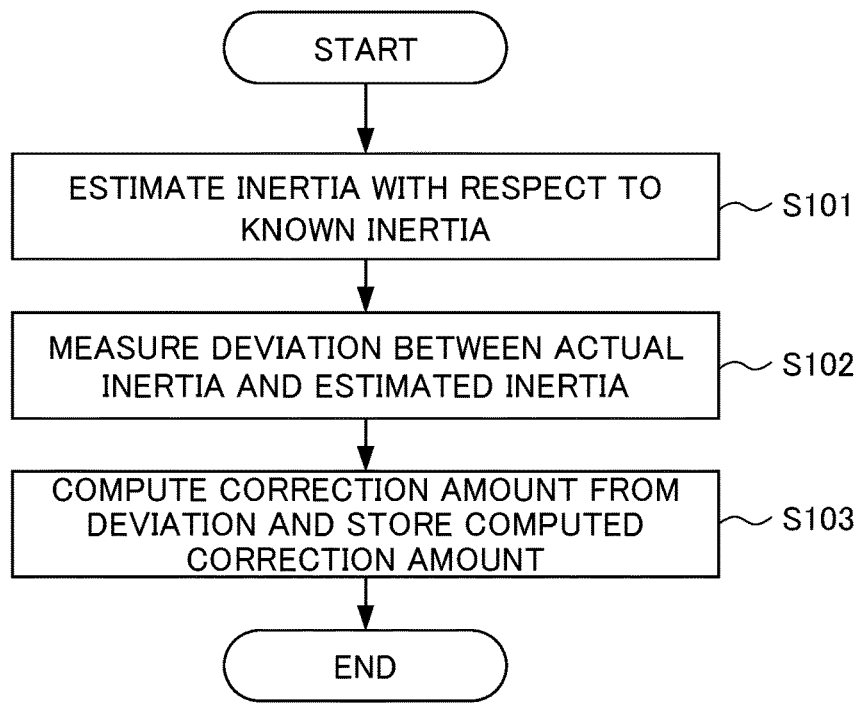
FIG. 4 is a flowchart of a process of acquiring a correction amount for correcting estimation inertia in advance according to the present embodiment.

A method of acquiring the correction amount will be described. FIG. 4 is a flowchart of a process of acquiring a correction amount for correcting the estimation inertia in advance according to the present embodiment. The flowchart illustrated in FIG. 4 is a process performed in advance before machining by the machine tool 1 is performed. First, the inertia estimating unit 22 estimates inertia with respect to known inertia (step S101). For example, the motor 10 is driven and controlled by a predetermined operation so that actual inertia $J_0$ is attained, and the inertia estimating unit 22 estimates the estimation inertia $J_0'$ on the basis of torque and current feedback signals of the motor 10 obtained during the operation.

A deviation between the actual inertia $J_0$ and the estimation inertia $J_0'$ is measured (step S102). A deviation $\Delta J$ is calculated on the basis of the difference between the known actual inertia $J_0$ and the estimation inertia $J_0'$. The processes of steps S101 and 3102 are performed at least once. In order to calculate the correction amount more accurately, it is preferable that the processes of steps S101 and S102 are performed plural times.

A correction amount is computed from the measured deviation and is stored in the storage unit 32 (step S103). Coefficients of a polynomial expression are determined on the basis of an inertia difference which is the difference between the actual inertia $J_0$ and the estimation inertia $J_0'$ and a time constant difference which is the difference between the actual acceleration or deceleration time constant and the acceleration or deceleration time constant estimated by the inertia estimating unit 22. When a linear expression is used for approximation as in the example illustrated in FIG. 3, an inclination k is calculated and a correction amount for an unknown inertia $J_x$ is stored in the storage unit 34 as $-k\Delta J$. The correction amount may be calculated similarly when a plurality of inertia differences and a plurality of time constant differences are acquired and a polynomial expression is fitted to a set of these pieces of data. The correction amount may be calculated using a high-order expressions of the 2nd or higher order and a trigonometric function.

In the process of step S103 of the present embodiment, the maximum and minimum values of the acceleration or deceleration time constant are set. The maximum and minimum values of the acceleration or deceleration time constant can be set on the basis of the deviations $\Delta J$ and $\Delta a$ and the like. The maximum value of the acceleration or deceleration time constant is used for preventing the acceleration from entering an unallowable dangerous region and the minimum value is used for preventing the acceleration from entering a region where productivity decreases to an unallowable extent. Either the maximum value or the minimum value may be set.

Figure 5:
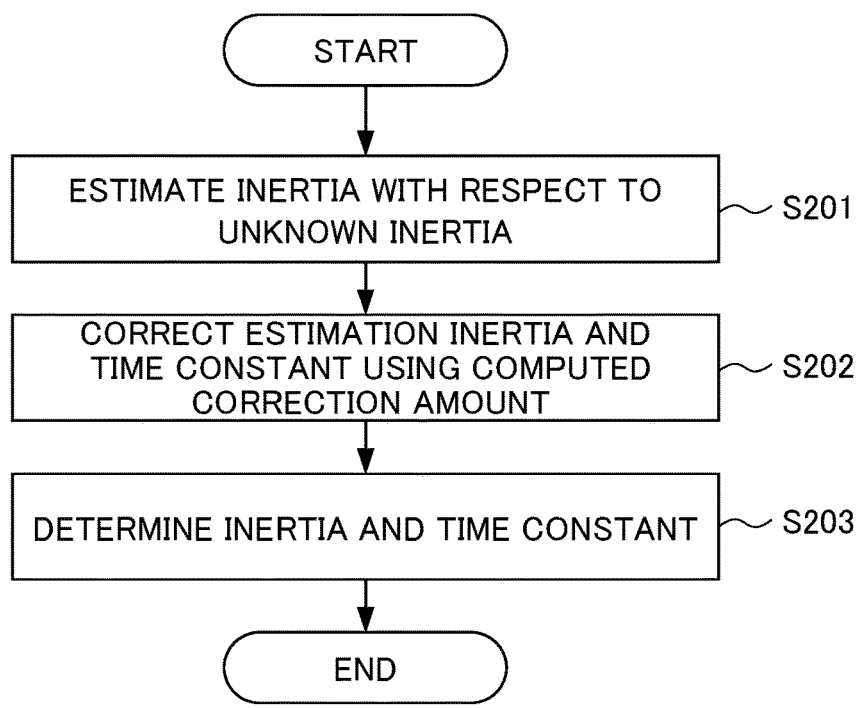
FIG. 5 is a flowchart of a process of correcting and determining the inertia and the acceleration or deceleration time constant using a correction amount according to the present embodiment.

Next, the inertia and the acceleration or deceleration time constant determined on the basis of the determined correction amount will be described. FIG. 5 is a flowchart of a process of correcting and determining the inertia and the acceleration or deceleration time constant using a correction amount according to the present embodiment. First, the inertia estimating unit 22 estimates the inertia with respect to an unknown inertia $J_x$ on the basis of the feedback information of torque and current during operation of the motor 10 (S201). Subsequently, the estimation inertia and the acceleration or deceleration time constant (the time constant) are corrected on the basis of the correction amount determined in the processes of steps S101 to S103 (step S202). The corrected estimation inertia and the corrected acceleration or deceleration time constant (the corrected time constant) are determined (step S203).

In the present embodiment, in the process of step S203, it is also determined whether the acceleration or deceleration time constant is within the range of the maximum and minimum values. For example, the maximum value is set as the acceleration or deceleration time constant when the acceleration or deceleration time constant exceeds the maximum value, and the minimum value is set as the acceleration or deceleration time constant when the acceleration or deceleration time constant is smaller than the minimum value.

According to the above-described embodiment, the following advantages are obtained. The controller 2 of the motor 10 that drives the work (a driven body) W includes: the inertia estimating unit 22 that estimates inertia on the basis of the feedback information (torque and current) of the motor 10; the computing unit 31 that computes an acceleration or deceleration time constant of the motor 10 from an estimation inertia estimated by the inertia estimating unit 22; the storage unit 32 that stores an inertia difference which is a difference between the estimation inertia and at least one known actual inertias and a time constant difference which is a difference between an actual acceleration or deceleration time constant corresponding to the actual inertia and the acceleration or deceleration time constant calculated on the basis of the estimation inertia; and the correction unit 33 that corrects the acceleration or deceleration time constant calculated by the computing unit 31 using the inertia difference and the time constant difference stored in the storage unit 32.

In this way, it is possible to accurately set the acceleration or deceleration time constant so as to fall within a range where the acceleration does not increase excessively since the correction amount is calculated on the basis of the deviation $\Delta J$. By taking an estimation error in the same machine tool 1 into consideration, it is possible to acquire the acceleration or deceleration time constant appropriately even when adjustment is performed repeatedly.

In the present embodiment, the controller 2 corrects the acceleration or deceleration time constant using coefficients acquired by performing polynomial fitting with respect to a plurality of inertia differences and a plurality of time constant differences.

In this way, since the correction amount can be calculated more accurately on the basis of a plurality of pieces of data, it is possible to set the inertia and the acceleration or deceleration time constant with high accuracy.

In the present embodiment, the correction unit 33 sets a maximum value or a minimum value of the acceleration or deceleration time constant or both from the difference stored in the storage unit 34.

In this way, it is possible to prevent the acceleration from entering a dangerous region and to prevent the acceleration from decreasing so much that efficiency decreases.

While a preferred embodiment of the present invention has been described, the present invention is not limited to the above-described embodiment but may be changed appropriately.

EXPLANATION OF REFERENCE NUMERALS

W: Work
2: Controller
10: Motor
22: Inertia estimating unit
31: Computing unit
32: Storage unit
33: Correction unit

What is claimed is:

1. A controller of a motor that drives a driven body, the controller comprising:
a processor configured to control the controller to:
estimate inertia on the basis of feedback information of the motor;
compute an acceleration or deceleration time constant of the motor from the estimated inertia;
store an inertia difference which is a difference between the estimated inertia and at least one known actual inertia and a time constant difference which is a difference between an actual acceleration or deceleration time constant corresponding to the actual inertia and an acceleration or deceleration time constant calculated on the basis of the estimated inertia; and
correct the acceleration or deceleration time constant calculated using the inertia difference and the time constant difference stored in order to reliably prevent the driven body from moving at an excessively high acceleration by setting the acceleration or deceleration time constant to fall within an appropriate range.

2. The controller according to claim 1, wherein the acceleration or deceleration time constant is corrected using coefficients acquired by performing polynomial fitting with respect to a plurality of inertia differences and a plurality of time constant differences.

3. The controller according to claim 1, wherein the processor is further configured to control the controller to set a maximum value or a minimum value of the acceleration or deceleration time constant from the time constant difference stored.

* * * * *